United States Patent [19]

Simon

[11] Patent Number: 4,627,389
[45] Date of Patent: Dec. 9, 1986

[54] TWO-STROKE INTERNAL COMBUSTION ENGINE

[76] Inventor: Istvan Simon, Rosengässchen 7, 8200 Schaffhausen, Switzerland

[21] Appl. No.: 757,658

[22] Filed: Jul. 22, 1985

[30] Foreign Application Priority Data

Jul. 24, 1984 [CH] Switzerland ............... 3575/84

[51] Int. Cl.[4] .............. F02D 19/00; F02B 75/24
[52] U.S. Cl. ............... 123/25 C; 123/56 BC; 123/73 AA
[58] Field of Search ........... 123/25 C, 25 D, 56 BC, 123/73 AA, 61 R, 57 B

[56] References Cited

U.S. PATENT DOCUMENTS

| | | | |
|---|---|---|---|
| 870,240 | 11/1907 | Libby | 123/73 AA |
| 1,527,166 | 2/1925 | Bezu | 123/73 AA |
| 2,027,891 | 1/1936 | Weitzel | 123/61 R |
| 2,147,666 | 2/1939 | Park | 123/56 BC |
| 2,212,167 | 8/1940 | Peterson | 123/25 C |
| 3,074,228 | 1/1963 | Lee | 123/25 C |
| 3,377,997 | 4/1968 | Combs | 123/56 BC |
| 3,517,652 | 6/1970 | Albertson | 123/56 BC |

Primary Examiner—Ira S. Lazarus
Attorney, Agent, or Firm—Abelman Frayne Rezac & Schwab

[57] ABSTRACT

A two-stroke internal combustion engine is disclosed in which transfer of inlet air occurs from the aspiration chamber into the combustion chamber via channels running within the piston. The outer surfaces of the piston and the inner surfaces of the cylinder may with advantage be provided with heat resistant ceramic layers. Radial forces on the piston may be suppressed by means of a slidable piston guide cradle mounted on the cylinder block. Provision is made to inject water into an extension of the compression chamber. This greatly increases power output and also equalizes temperature and stresses in the cylinder walls. Heating means may be provided mounted in the cylinder end face of the combustion chamber.

8 Claims, 9 Drawing Figures

FIG. 3
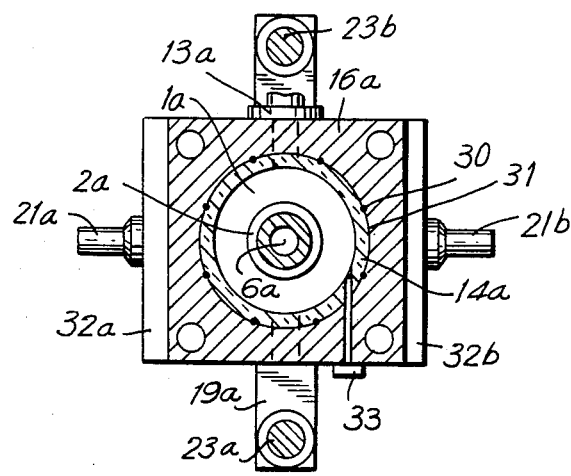
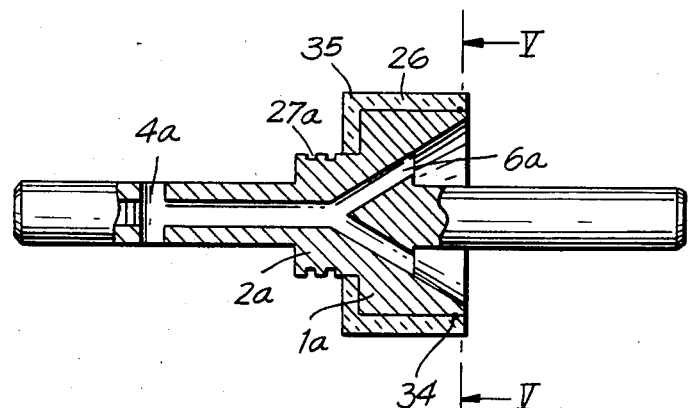
FIG. 4
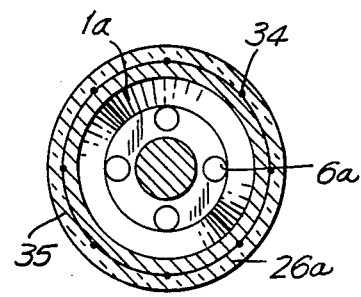
FIG. 5

TWO-STROKE INTERNAL COMBUSTION ENGINE

BACKGROUND OF THE INVENTION

The invention relates to a two-stroke internal combustion engine having one or more pistons preferably mounted in pairs coaxially for equal movements on opposite strokes, with a crankshaft which may be located between these pistons, wherein the faces of the pistons lying adjacent the crankshaft are designed to participate in the air inlet stroke, and an air inlet port, and an outlet port for the waste gas are arranged on opposite sides of and near the longitudinal centre of the piston chamber.

According to my own earlier invention a two-stroke oscillating piston engine has been proposed (see my U.S. Pat. No. 4,414,927) in which the fresh air supply channels are located in the cylinder casing and the piston rod is guided to ensure straight line movement in the cylinder housing.

German published specification No. DE-OS-3029287A1 to Franz Stelzer discloses a two stroke internal combustion engine in which the fresh air supply channels having a hollow cylindrical cross section are arranged longitudinally of the piston rod.

OBJECTS OF THE INVENTION

It is an object of the instant invention to provide a two-stroke internal combustion engine having fresh air supply channels which are as short as possible and provide a technically favourable flow path.

It is a further object of the instant invention to provide a two-stroke internal combustion engine in which the radial forces on the pistons are to a large extent eliminated so that the piston and the inner wall of the cylinder can be provided with a temperature resistant insulating layer with the smallest possible degree of play.

It is a further object of the instant invention to provide an internal combustion engine wherein means for reducing the maximum temperature and for equalising the temperatures in the walls defining the combustion chamber are provided.

BRIEF SUMMARY OF THE INVENTION

According to the invention, all these objects are achieved by means of a two-stroke internal combustion engine having coaxial pistons mounted for equal movements on opposite strokes, a crankshaft located between the pistons which latter have faces adjacent the crankshaft formed to assist the introduction of fresh air during the inlet stroke, and a fresh air inlet port and a waste gas outlet port located on opposite sides of the piston chamber near its centre wherein the engine comprises (a) one or more piston rods, each associated with a piston, (b) a frame-like guide cradle in which said piston rods are mounted, (c) a cylindrical extension on the combustion chamber face of each piston, (d) an extension of the combustion chamber of each cylinder which receives the corresponding cylindrical piston extension in the compression position of the piston, (e) a fresh air supply channel extending longitudinally of each piston rod, (f) fresh air supply channels which lead from each piston end face adjacent the crankshaft into said associated longitudinal channel, (g) a further channel extending across each piston rod communicating with said longitudinal channel and opening, in the dead centre position of the associated piston, when in the compression position, into said extension of the combustion chamber of the associated cylinder, (h) a projecting guide boss on the base of each cylinder remote from the crankshaft which guide boss receives the associated piston rod and closes the associated further cross channel when said channel is located within the boss, (i) a fuel injection port formed in each cylinder casing adjacent the base of the cylinder, (j) a separate water injection port leading into the extension of each combustion chamber, (k) a separate non-return valve connected to each water injection port.

The invention may also advantageously contain the additional features:

(l) a ceramic layer covering each piston, (m) a ceramic layer covering the inner surface of each cylinder, (n) a heating or heat storage element located in the base of each combustion chamber, and (o) means for heating said heat storage element for example by connecting said heat storage element to a low voltage electrical supply.

The two-stroke internal combustion engine of the invention may operate on the compression (diesel) system or using gasoline and sparking ignition plugs.

BRIEF DESCRIPTION OF THE DRAWINGS

An embodiment of the instant invention will now be described by way of example with reference to the accompanying drawings.

In the accompanying drawings there is shown:

FIG. 3 a section through the combustion chamber on the line III—III in FIG. 2.

FIG. 4 a longitudinal section through piston and piston rod on the line IV—IV in FIG. 2.

FIG. 5 a section on the line V—V in FIG. 4 through the piston with a ceramic layer secured by a metal wire lattice.

Figure 1:
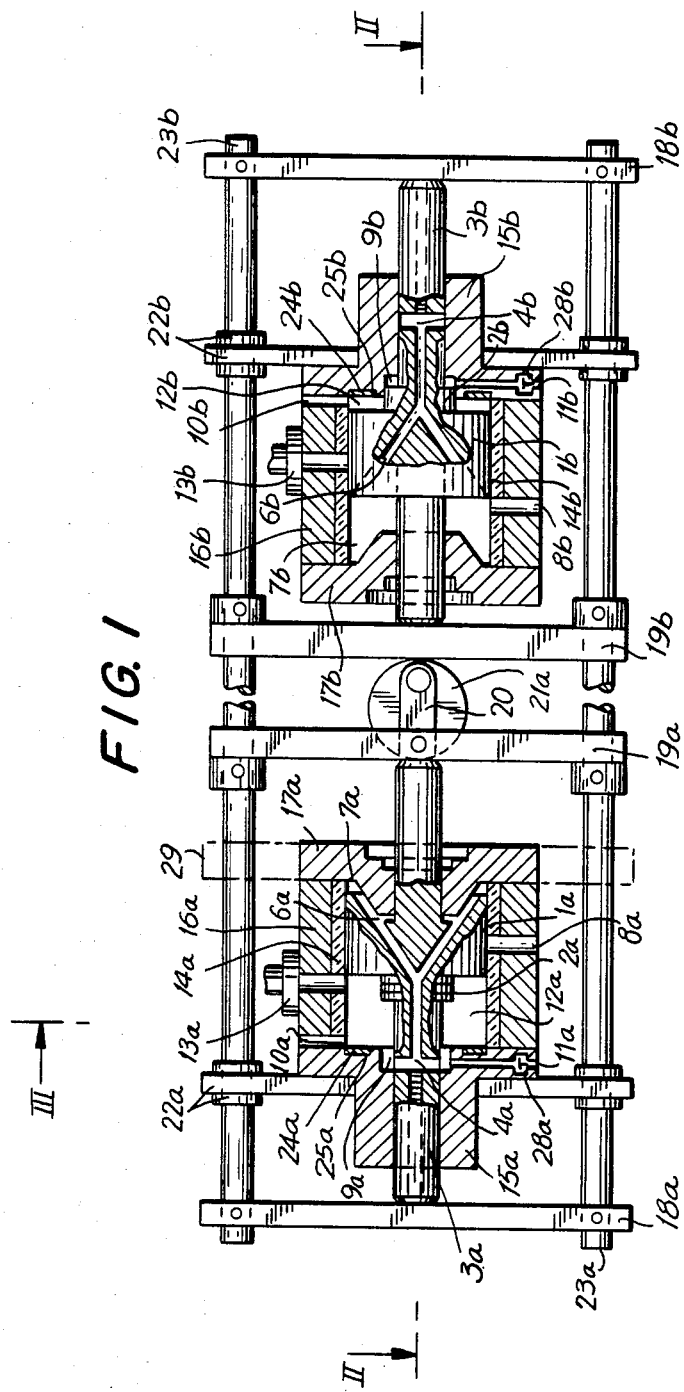
FIG. 1 a vertical section through the opposed cylinders and pistons.
Figure 2:
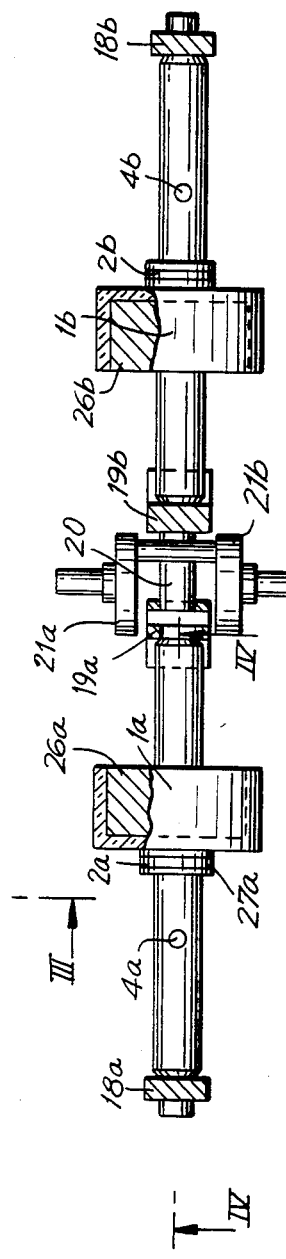
FIG. 2 a horizontal section through FIG. 1 on the line II—II.

The two-stroke internal combustion engine shown in FIGS. 1 and 2 has pistons 1a, 1b which lie on the same axis and are mounted for equal movements on opposite strokes. The two piston rods 3a, 3b are mounted on the axis of a frame-like guide cradle having outer cross-members 18a, 18b, inner cross-members 19a, 19b and cylindrical rods 23a, 23b.

The cylinders comprise piston rod guide bosses 15a, 15b, cylinder casings 16a, 16b and bases 17a, 17b and are secured together by side plates 32a, 32b (FIG. 3) to form a cylinder block. Arms are mounted on the two cylinder heads, which have longitudinally directed bearings 22a, 22b at their outer ends. In these are movably guided the cylindrical rods 23a, 23b of the guide cradle, which extend parallel to the axis of the piston rods. The piston rods 3a, 3b lie with their end faces against the outer cross-members 18a, 18b and the inner crossmembers 19a, 19b. The inner cross-member 19a is coupled by a connecting rod 20 to a crankshaft 21a, 21b, which is located between the inner cross-members 19a, 19b and the pistons 1a, 1b.

The face of the piston lying adjacent to the crankshaft 21a, 21b is designed to participate in the fresh air inlet stroke. Near the middle of the piston chamber 7a, 7b, 12a, 12b and extending through the cylinder casing 16a, 16b there is provided on one side a fresh air inlet port 8a, 8b and on the other side an outlet port 13a, 13b for the waste gas.

The pistons 1a, 1b have on their combustion face a cylindrical extension 2a, 2b. This is provided on its periphery with parallel circular grooves 27a, 27b (FIGS. 2 and 4). The cylindrical extension (2a, 2b) extends in the dead centre position of this piston at compression into a cylindrical extension 9a, 9b of the compression chamber of the piston rod guide bosses 15a, 15b (FIG. 1 right hand side).

From the face of the pistons 1a, 1b lying adjacent the crank shaft 21a, 21b four fresh air channels 6a, 6b lead through the piston 1a, 1b into a common channel extending longitudinally of the piston rod 3a, 3b (FIGS. 1, 4 and 5). This longitudinal channel opens into a channel 4a, 4b extending across the axis of the piston rod. In the region of the dead centre position of the piston 1a, 1b in compression the cross channel 4a, 4b leads into the corresponding compression extension chamber 9a, 9b of the piston rod guide bosses 15a, 15b (FIG. 1 left hand side) when the opposite piston is in compression and thus when its own piston is retracted.

The cylinder bases 17a, 17b remote from the crankshaft 21a, 21b are formed with the projecting piston rod guide bosses 15a, 15b. These bosses 15a, 15b serve for mounting the piston rod as well as for closing the cross channels 4a, 4b at the side (FIG. 1 right hand side).

A fuel injection port 10a, 10b is provided in the cylinder casing 16a, 16b adjacent the base of the combustion chamber 12a, 12b. A water injection port 11a, 11b provided with a non-return valve 28a, 28b leads into the extension chamber 9a, 9b.

The piston 1a, 1b (FIGS. 1, 2, 4 and 5) is provided on its face adjacent the combustion chamber 12a, 12b and on its periphery, with a cast ceramic layer 26a, 26b, 35 (FIGS. 4 and 5) which is secured by means of a metal lattice 34. The metal lattice 34 is welded to the piston. In a similar way, the inner surface of the cylinder is provided with a ceramic layer 14a, 14b, 31 secured by a metal lattice 30 (FIGS. 1 and 3). Into this layer leads a thermostat 33. It is of course equally possible to bond the ceramic to the metal by any other convenient method which gives a sufficiently strong bond.

In the cylinder base of the combustion chamber 12a, 12b is mounted a heat storage element 24a, 24b made of graphite containing metal and which can be heated by any convenient method for example using a low voltage electric heater. The heat storage element 24a, 24b is insulated on its outer side by a ceramic plate 25a, 25b. The water injection port 11a, 11b, heat storage element 24a, 24b and thermostat 33 serve to equalise the temperature and stress in the cylinder wall. In order to prevent a sudden influx of water into the combustion chamber 12a, 12b the cylindrical extensions 2a, 2b with the parallel circular grooves 27a, 27b are provided.

The inner cylinder bases 17a, 17b adjacent the crankshaft 21a, 21a are provided with bosses projecting into the piston chamber 7a, 7b in order to mount and seal the piston rods 3a, 3b.

The mode of operation of the two-stroke internal combustion engine described is apparent from FIGS. 6 to 9.

Figure 6:
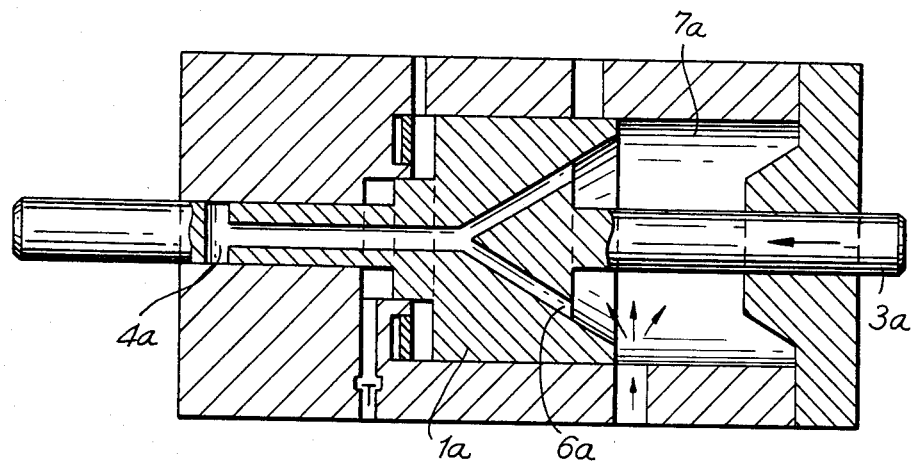
FIG. 6 a cross-section through cylinder and piston, the fresh air suction chamber being open.

In FIG. 6 the fresh air aspiration chamber 7a is fully open and the channels 6a, 4a through the piston 1a and piston rod 3a are closed.

Figure 7:
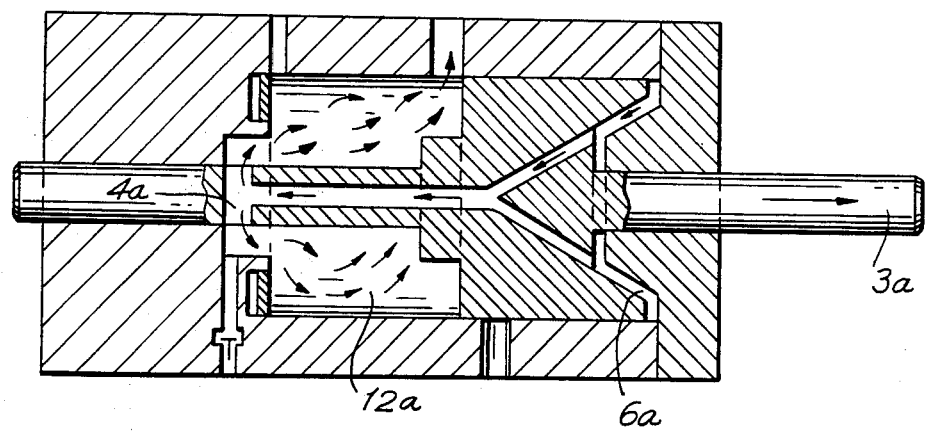
FIG. 7 a cross-section through the open combustion chamber.

In FIG. 7 the combustion chamber 12a is fully open and the fresh air channel 4a opens into the combustion chamber 12a to drive out the burnt gas.

Figure 8:
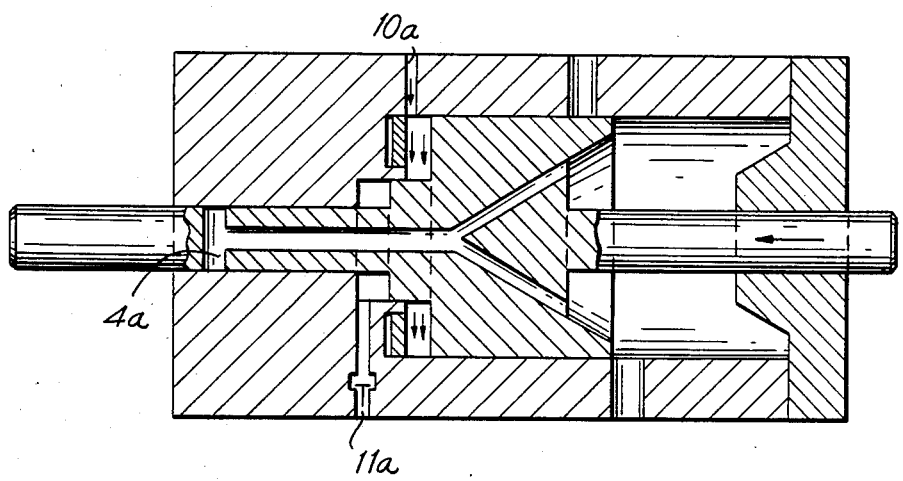
FIG. 8 a cross-section when the fresh air has been compressed.

In FIG. 8 the fresh air is compressed.

Fuel injection follows through the port 10a and water injection through the port 11a in separate chambers.

Figure 9:
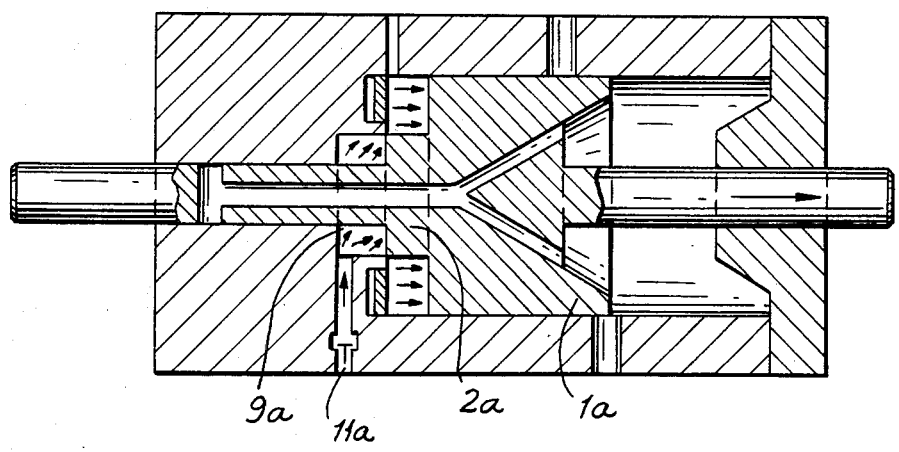
FIG. 9 cross-section at the termination of water injection.

As shown in FIG. 9, the water injection stops when the cylindrical piston extension 2a opens the extension chamber 9a again. The water will be warmed on entry into the piston by heat taken from the surrounding walls and the compressed air. As the piston moves further to the left from the position shown in FIG. 9, water and the ignited mixture of air and fuel are allowed to mix. The resulting steam generation gives a sudden increase in the power delivered to the piston and hence in the effeciency of the engine.

The guide cradle has the effect of suppressing the radial piston forces and allows the radial play and the friction of the piston to be kept small. As shown in broken lines at the left hand side of FIG. 1 the bases 17a, 17b of the cylinders can be provided with sliding end guides 29 for the cylindrical rods 23a, 23b of the frame-like cradle.

What is claimed is:

1. In a two-stroke internal combustion engine having two coaxial pistons mounted for equal movements on opposite strokes, a crankshaft located between the pistons which have faces adjacent the crankshaft formed to assist the introduction of fresh air during the inlet stroke, and a fresh air inlet port and a waste gas outlet port located on opposite sides of the piston chamber near its centre, the improvement comprising
    (a) two piston rods, each carrying one of the pistons,
    (b) a frame-like guide cradle in which said piston rods are mounted,
    (c) a cylindrical extension on the combustion chamber face of piston,
    (d) an extension of the combustion chamber of each cylinder which receives the corresponding cylindrical piston extension in the compression position of the piston,
    (e) a fresh air supply channel extending longitudinally of each piston rod,
    (f) fresh air supply channels which lead from each piston end face adjacent the crankshaft into said associated longitudinal channel,
    (g) a further channel extending across each piston rod communicating with said longitudinal channel and opening, in the dead centre position of the associated piston, when in the compression position, into said extension of the combustion chamber of the associated cylinder,
    (h) a projecting guide boss on the base of each cylinder remote from the crankshaft which guide boss receives the associated piston rod and closes the associated further cross channel when said channel is located within the boss, (i) a fuel injection port formed in each cylinder casing adjacent the base of the cylinder, (j) a separate water injection port leading into the extension of each combustion chamber, (k) a separate non-return valve connected to each water injection port.

2. A two-stroke internal combustion engine according to claim 1, wherein (a) bearing support structure extends outwardly from each cylinder, (b) longitudinally oriented slide bearings are carried by said structure, and (c) longitudinal rods of said frame-like guide cradle are mounted in said bearings.

3. A two-stroke internal combustion engine according to claim 2, wherein, (a) a ceramic layer is provided on the face of each piston adjacent the combustion chamber, (b) a metal wire lattice serves to secure each ceramic layer to the respective piston.

4. A two-stroke internal combustion engine according to claim 3, wherein (a) a ceramic layer is provided on the inner surface of each cylinder, (b) a metal wire lattice serves to secure each said cylinder ceramic layer to the respective cylinder, and (c) a separate thermostat is located in each said cylinder ceramic layer.

5. A two-stroke internal combustion engine according to claim 4, wherein (a) each of said heat storage elements comprises graphite containing metal, and (b) a separate ceramic plate serves to insulate the outer side of said heat storage element.

6. A two-stroke internal combustion engine according to claim 5, wherein parallel circular grooves are formed in the periphery of each of said cylindrical piston extensions.

7. A two-stroke internal combustion engine according to claim 6, wherein a frustum-like boss projects into each cylinder from the respective cylinder base adjacent the crankshaft and serves for slidably mounting the associated piston rod.

8. In a two-stroke internal combustion engine having a piston, a crankshaft said piston having a face adjacent the crankshaft formed to assist the introduction of fresh air during the inlet stroke, and a fresh air inlet port and a waste gas outlet port located on opposite sides of the piston chamber near its centre, the improvement comprising (a) a piston rod, carrying the piston, (b) a frame-like guide cradle in which said piston rod is mounted, (c) a cylindrical extension on the combustion chamber face of piston, (d) an extension of the combustion chamber of the cylinder which receives the corresponding cylindrical piston extension in the compression position of the piston, (e) a fresh air supply channel extending longitudinally of the piston rod, (f) fresh air supply channels which lead from the piston end face adjacent the crankshaft into said associated longitudinal channel, (g) a further channel extending across the piston rod communicating with said longitudinal channel and opening, in the dead centre position of the piston, when in the compression position, into said extension of the combustion chamber of the cylinder, (h) a projecting guide boss on the base of the cylinder remote from the crankshaft which guide boss receives the piston rod and closes the further cross channel when said channel is located within the boss, (i) a fuel injection port formed in the cylinder casing adjacent the base of the cylinder, (j) a separate water injection port leading into the extension of the combustion chamber, (k) a separate non-return valve connected to the water injection port.

* * * * *